United States Patent [19]
Demore

[11] Patent Number: 6,098,913
[45] Date of Patent: Aug. 8, 2000

[54] MACHINE FOR APPLYING A PROTECTIVE MATERIAL ONTO A PIPE

[75] Inventor: John C. Demore, Houston, Tex.

[73] Assignee: Tek-Rap, Inc., Houston, Tex.

[21] Appl. No.: 09/265,151

[22] Filed: Mar. 9, 1999

[51] Int. Cl.[7] .......................... B21C 47/10; B65H 81/06
[52] U.S. Cl. ...................... 242/447.3; 242/437; 242/443
[58] Field of Search ................................ 242/447, 447.3, 242/437, 437.3, 443, 444, 444.1, 444.2, 444.3, 444.4

[56] References Cited

U.S. PATENT DOCUMENTS

| | | |
|---|---|---|
| Re. 17,675 | 5/1930 | Christopher . |
| 183,517 | 10/1876 | Thomas . |
| 369,868 | 9/1887 | Mathewson . |
| 584,281 | 6/1897 | Allen ................................... 242/447.3 |
| 870,199 | 11/1907 | Scott . |
| 1,151,096 | 8/1915 | French . |
| 1,380,837 | 6/1921 | Replogle . |
| 1,500,769 | 7/1924 | Rosener et al. . |
| 1,669,555 | 5/1928 | Finley . |
| 1,686,929 | 10/1928 | Rosener . |
| 1,911,601 | 5/1933 | Boughton . |
| 1,956,945 | 5/1934 | Easton . |
| 2,011,463 | 8/1935 | Vianini ................................. 242/444 X |
| 2,285,654 | 6/1942 | Hanna et al. . |
| 2,319,413 | 5/1943 | Leathers et al. .................. 242/447.3 X |
| 2,371,107 | 3/1945 | Mapes . |
| 2,533,717 | 12/1950 | Coursey ................................ 242/444.1 |
| 2,556,827 | 6/1951 | Striano .................................. 242/447.3 |
| 2,605,055 | 7/1952 | Scott et al. . |
| 2,964,252 | 12/1960 | Rosenberg ............................ 242/449.3 |
| 2,967,390 | 1/1961 | McCormick . |
| 3,039,707 | 6/1962 | Beck et al. ........................... 242/447.3 |
| 3,052,419 | 9/1962 | Huck ................................. 242/447.3 X |
| 3,095,156 | 6/1963 | Warnken .......................... 242/447.3 X |
| 3,100,089 | 8/1963 | Norrholm . |
| 3,112,895 | 12/1963 | Kinney ..................................... 242/437 |
| 3,143,306 | 8/1964 | Dijkmans et al. .................... 242/437.3 |
| 3,228,616 | 1/1966 | Grosh ....................................... 242/437 |
| 3,378,427 | 4/1968 | McClean ............................. 242/444 X |
| 3,540,671 | 11/1970 | Moehle . |
| 3,603,522 | 9/1971 | Herrmann . |
| 3,606,183 | 9/1971 | Turk ................................. 242/437.3 X |
| 3,698,651 | 10/1972 | Miller ...................................... 242/437 |
| 3,724,768 | 4/1973 | Breitfuss et al. ................. 242/447.3 X |
| 3,823,883 | 7/1974 | Fencl et al. ....................... 242/447.3 X |
| 4,010,054 | 3/1977 | Bradt .................................. 242/444 X |
| 4,170,864 | 10/1979 | Beyerl et al. . |
| 4,251,036 | 2/1981 | McLain .................................. 242/444 |
| 4,261,526 | 4/1981 | Roj . |
| 4,541,887 | 9/1985 | Carter .................................. 242/444 X |
| 5,725,177 | 3/1998 | Bartelmuss et al. . |
| 5,727,749 | 3/1998 | Pensavecchia et al. . |
| 5,938,143 | 8/1999 | Yukitake ................................ 242/447 |

FOREIGN PATENT DOCUMENTS

| | | | |
|---|---|---|---|
| 898143 | 11/1953 | Germany ................................ 242/443 |
| 359048362 | 3/1984 | Japan .................................. 242/447.3 |
| 402079406 | 3/1990 | Japan ..................................... 242/443 |
| 85637 | 7/1957 | Netherlands ....................... 242/447.3 |
| 839128 | 6/1960 | United Kingdom ................ 242/437.3 |

*Primary Examiner*—Donald P. Walsh
*Assistant Examiner*—Emmanuel M. Marcelo
*Attorney, Agent, or Firm*—Salter & Michaelson

[57] ABSTRACT

A machine for applying one or more protective layers of material onto a tubular member, for example a pipe, in a substantially wrinkle free and continuous manner. The machine includes a brake tension unit for applying a constant tension to the protective material in order to neck down the material as it is applied onto the pipe, and a base unit for supporting and rotating the pipe. The constant brake tension unit preferably includes a conventional disc brake and a mounting arm for holding a core of material in engagement with the brake tension unit. Pressure applied to the rotor slows rotation of the rotor and the attached core which restricts the unwinding of the protective material from the core. Thus, as the material attempts to unwind from the core a preselected force is applied to resist the unwinding. The material is therefore placed under tension and, due to the nature of the protective material, the material elongates and necks down under the applied pressure. The brake unit may also include a tension arm for holding the protective layer against the pipe to prevent slack in the material as it is being applied.

16 Claims, 6 Drawing Sheets

MACHINE FOR APPLYING A PROTECTIVE MATERIAL ONTO A PIPE

TECHNICAL FIELD

The invention relates generally to a machine for applying a protective layer onto a tubular member, such as pipes and the like, and more particularly to a machine including a constant brake tension unit for applying one or more layers of a protective material spirally onto a pipe in a wrinkle free and continuous manner.

BACKGROUND OF RELATED ART

When utilizing pipes for various applications it is often desirable to coat the pipe with a layer of material in order to protect the pipe against corrosion or to provide other types of protection to the pipe, for example in order to insulate the pipe. Corrosion protection extends the life of the pipe and has found particular application in pipelines where miles upon miles of pipes are laid and where replacing and/or repairing the pipes would be difficult, time consuming and costly. Various types of machines are known to apply coatings or protective layers of material to the outer wall of a tubular member, such as a pipe. For example, as disclosed in U.S. Pat. No. Re. 17,675 to Christopher, it is known to helically wrap tape onto a pipe in order to protect the pipe against corrosion. As disclosed in U.S. Pat. No. 2,011,463 to Vianini, it is also known to spirally apply a layer of plastic material onto a pipe and to apply pressure on the joints of the spiral in order to regularize the joints and assist in the proper positioning of the plastic material.

Although wrapping the pipe with a layer of protective material affords a level of corrosion protection, this protection is limited by the ability of the material to prevent moisture and air from contacting the outer surface of the pipe and by the ability of the material to remain adhered to the pipe. Thus, there is continued development in the field to provide advanced methods for adhering corrosion resistant layers to the outer surface of a pipe in a cost-effective, convenient manner.

It is therefore an object of the present invention to provide a machine for applying a protective layer onto a tubular member, such as pipes and the like, in a wrinkle free and continuous manner so as to effectively adhere the protective layer to the outer surface of the pipe while preventing air and/or moisture from becoming entrapped between the protective layer and the pipe.

SUMMARY

In accordance with the present invention, there is provided a machine for applying one or more protective layers of material onto a tubular member, for example a pipe. The machine includes a brake tension unit for applying a constant tension to the protective material in order to elongate the material as it is applied onto the pipe, and a base unit for supporting and rotating the pipe. The constant brake tension unit preferably includes a conventional disc brake, such as those used in automobiles, having a rotor and two disc pads. The brake tension unit also includes a chucking system having a mounting arm for holding a core of material in engagement with the brake tension unit. Thus, as the rotor rotates around an axis "x", so does the chucking system and protective material. When pressure is applied to the rotor, rotation of the rotor and the attached core is slowed which restricts the unwinding of the protective material from the core. In this manner, as the material attempts to unwind from the core a preselected force is applied to resist the unwinding. The material is therefore placed under tension and, due to the nature of the protective material, the material stretches or elongates under the applied pressure. The brake tension unit is preset at a desired tension in order to apply a given tension to the brake which, in turn, selectively elongates the material as it is being applied onto the pipe, which is rotated by the base unit. The brake unit may also include a tension arm for holding the protective layer against the pipe to prevent slack in the material as it is being spirally applied.

In one embodiment, the brake tension unit is mounted to a frame carried on a variable speed control station which travels on the base unit and along the length of the pipe so as to uniformly apply the layer of protective material. The frame which carries the brake tension unit may preferably be adjustable so as to adjust the position of the unit depending upon the size of the pipe. In this manner, the brake tension unit may advantageously be used with pipes of any size. The unit may also include a pressure gauge for visually indicating the pressure at which the unit is set and a manual pressure setting member for increasing and/or decreasing the pressure setting of the brake unit.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE ILLUSTRATIVE EMBODIMENTS

Figure 1:
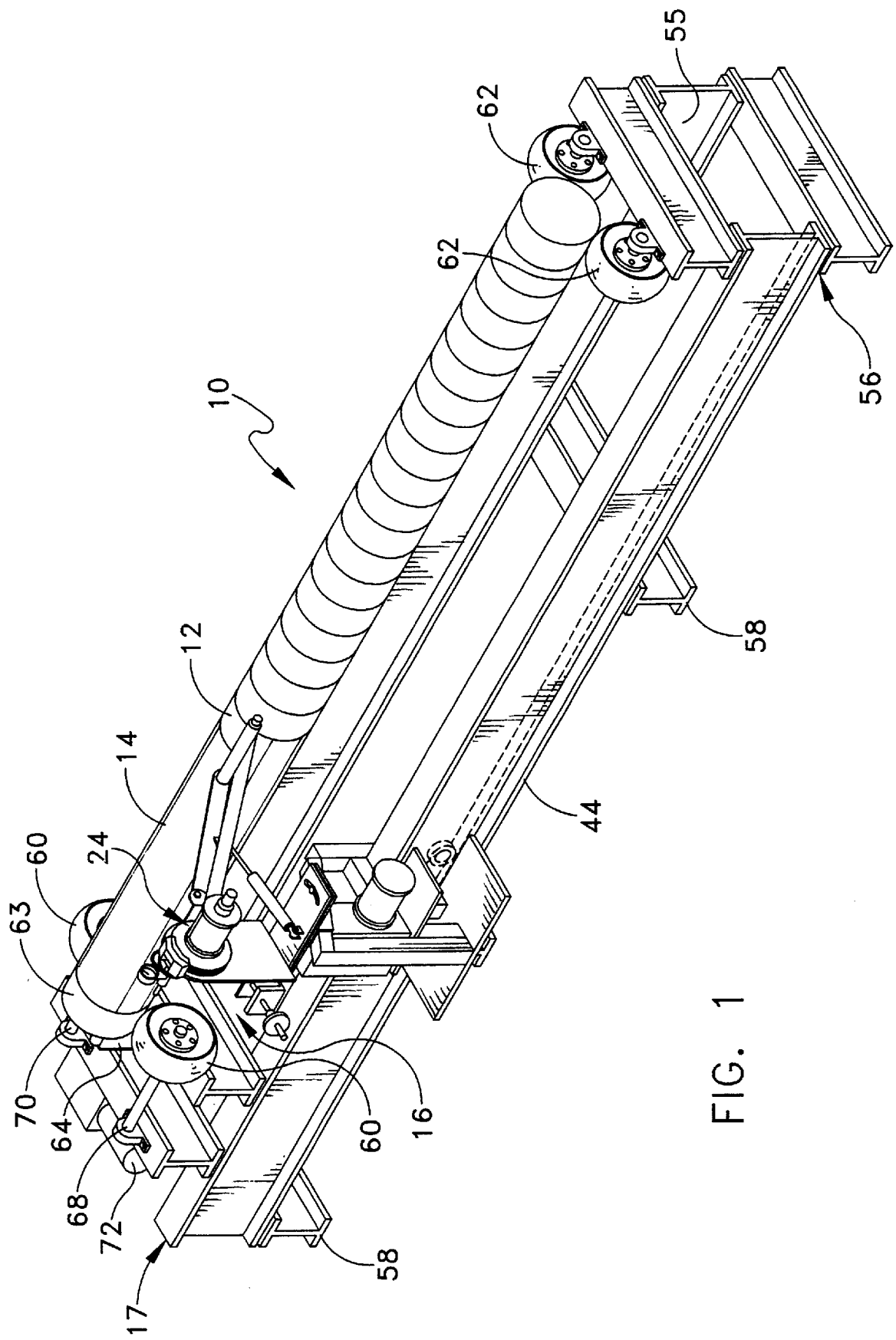
FIG. 1 is a perspective view of a machine for applying a protective layer of material onto a pipe including a brake tension unit according to the present invention.

A machine 10 for applying a protective layer of material 12 onto a pipe 14 is illustrated in FIG. 1. The machine includes a brake tension unit 16 for applying a constant tension to the protective material in order to elongate the material as it is applied onto the pipe and a base unit 17 for supporting and rotating the pipe. Elongation of the protective material by the brake tension unit allows the material to be applied to the pipe in a substantially wrinkle free and continuous manner so as to effectively adhere the protective layer of material to an outer surface of the pipe while preventing air and/or moisture from becoming entrapped between the protective layer and the pipe. By applying the protective material in this manner, improved corrosion resistance is achieved.

In the present embodiment, the brake tension unit 16 preferably includes a conventional rotor disc brake 18 (FIG.

Figure 5:
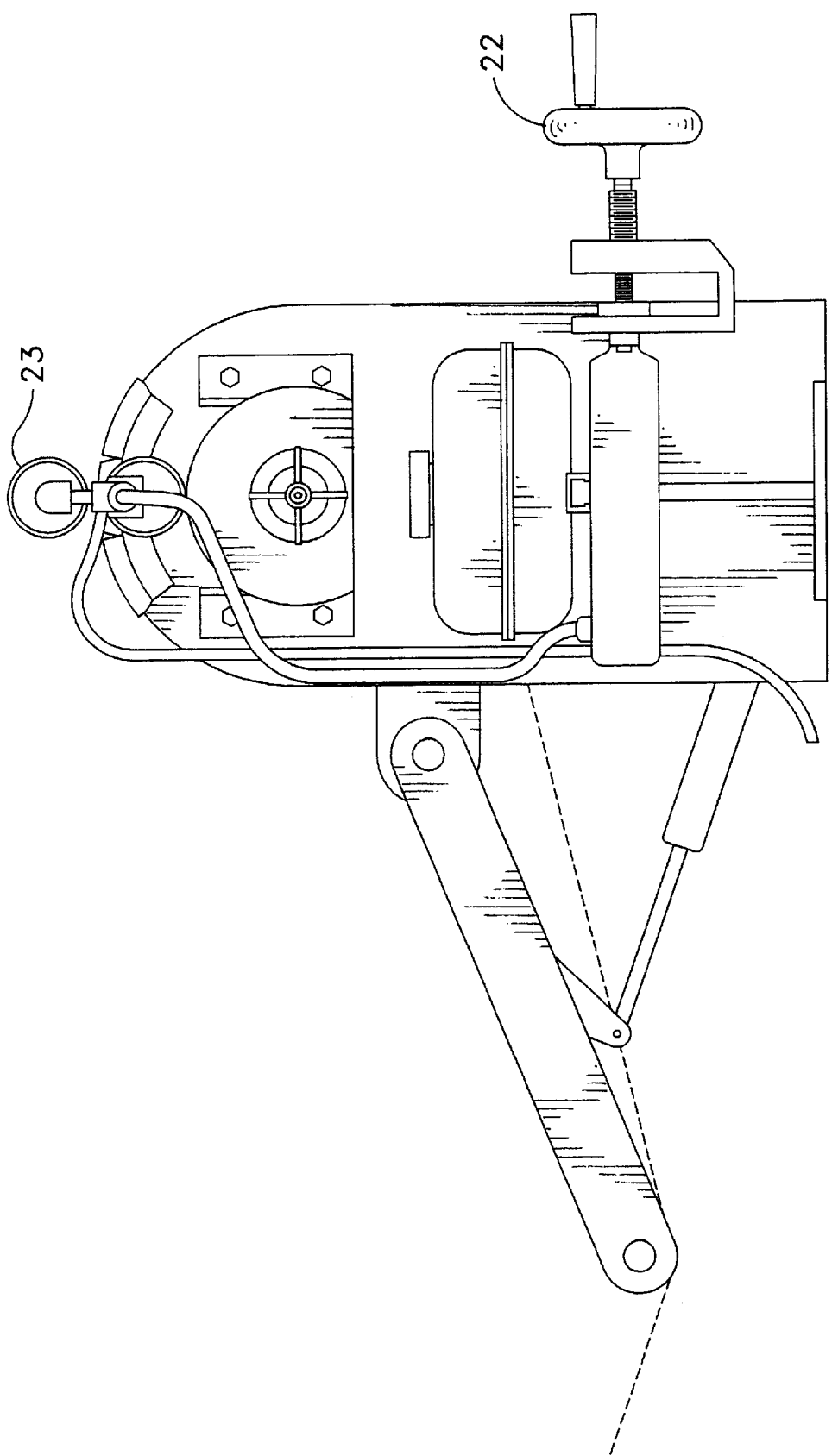
FIG. 5 is a rear view of the brake tension unit of FIG. 1.

2), such as those used in automobiles, having a rotor 20 and two disc pads mounted within a housing 21. Such rotor disc brakes are available from a number of sources, including Brake Thru Performance of Conroe, Texas. The brake pads engage either side of the rotor thus applying pressure to the rotor which, in turn, resists rotation of the rotor in a conventional manner. The more pressure which is applied to the rotor, the greater the resistance. A pressure setting member is preferably provided for increasing and/or decreasing the pressure setting of the brake unit. In the present embodiment, a manual crank 22 (FIG. 5) is provided which can be used to increase or decrease hydraulic pressure in the brake tension unit. Alternately, other devices such as pneumatic, hydraulic or electrically controlled devices may be utilized to set the pressure in the brake tension unit. A pressure gauge 23 is also preferably provided in order to visually indicate the pressure at which the brake tension unit is set.

Figure 2:
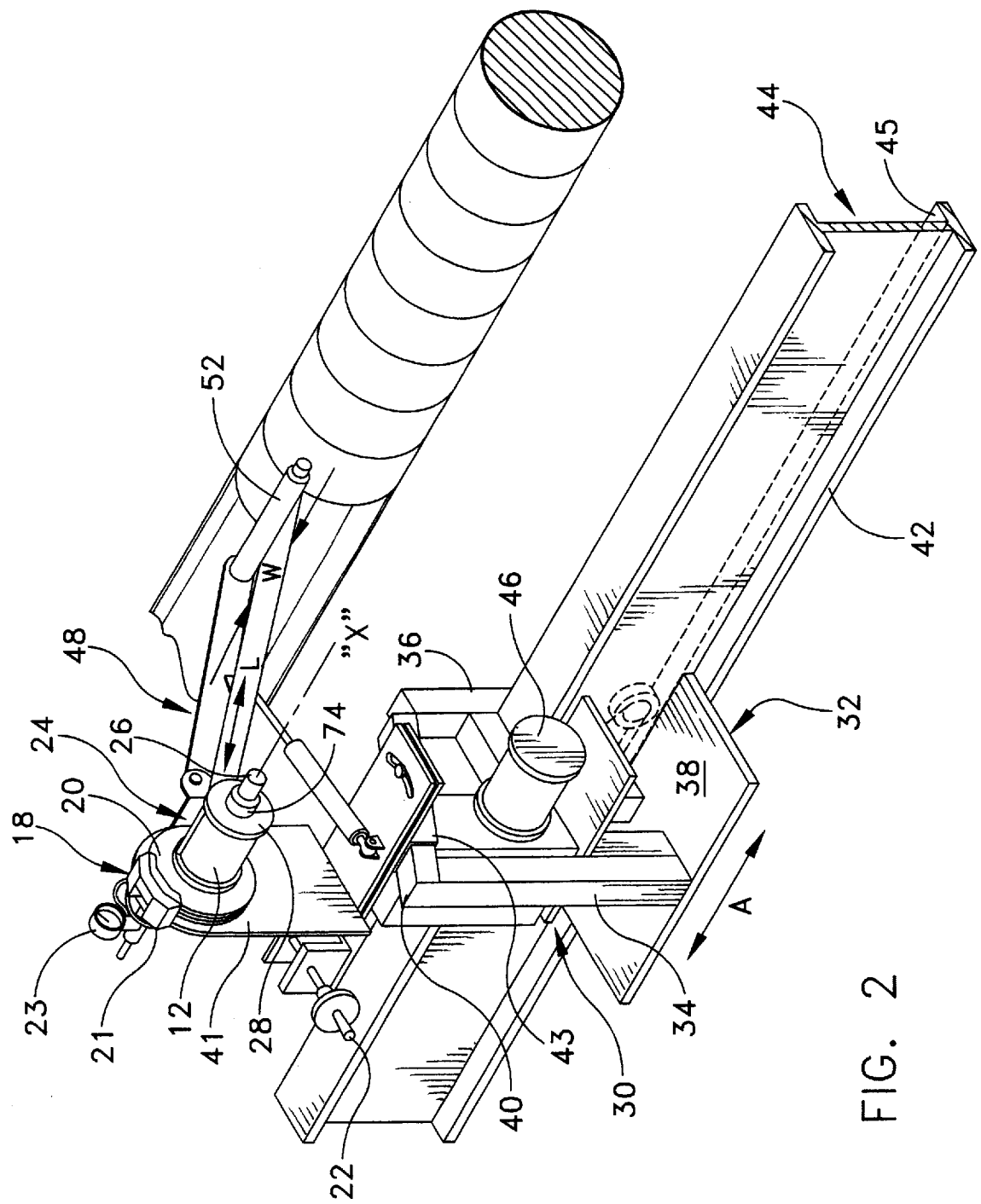
FIG. 2 is a partial perspective view of the machine of FIG. 1 showing an adjustable frame which carries the brake tension unit on a variable speed control station.
Figure 3:
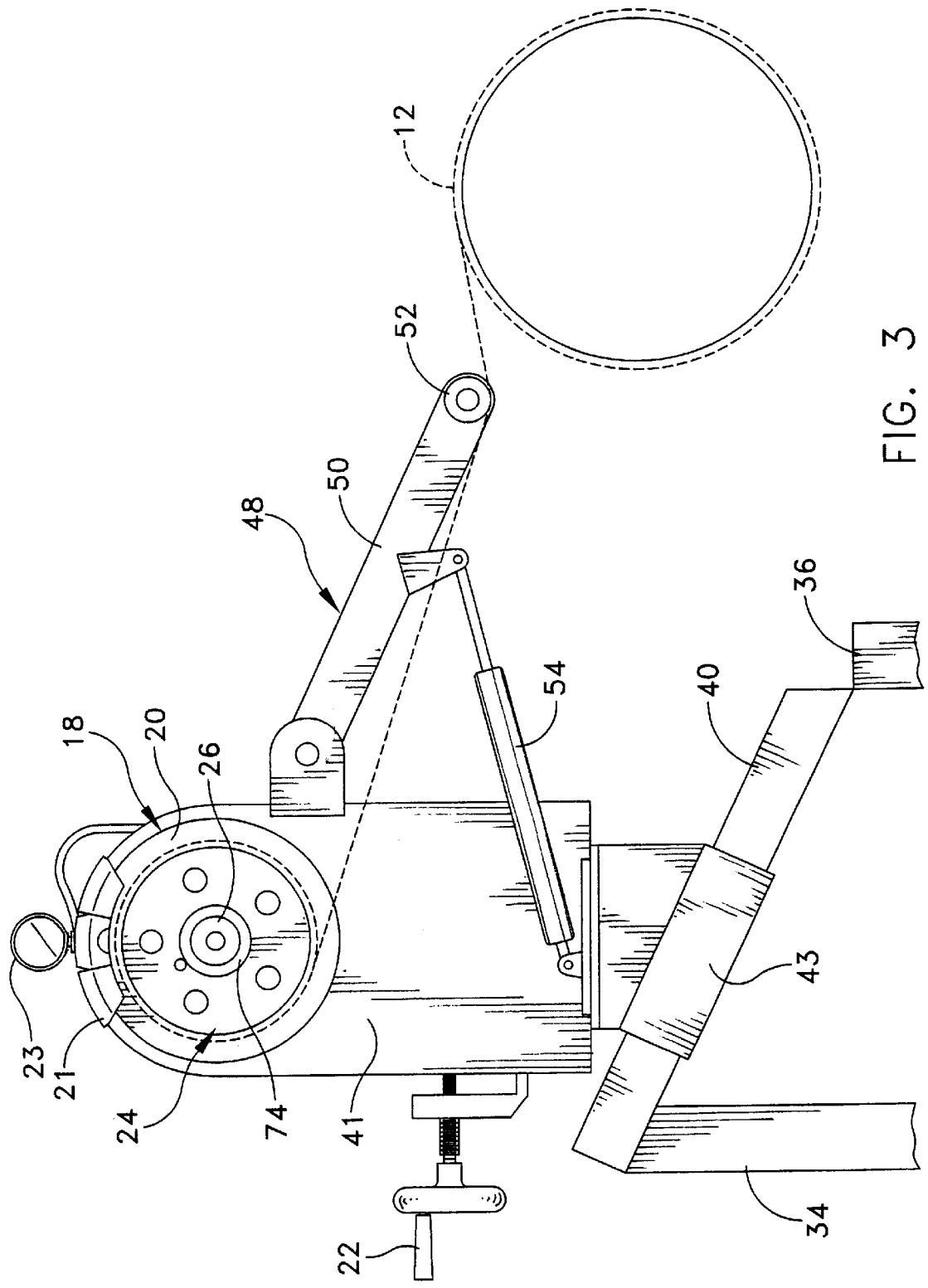
FIG. 3 is a front view of the brake tension unit of FIG. 1 including an adjustable tension arm m a first position applying a strip of protective material to the pipe.
Figure 4:
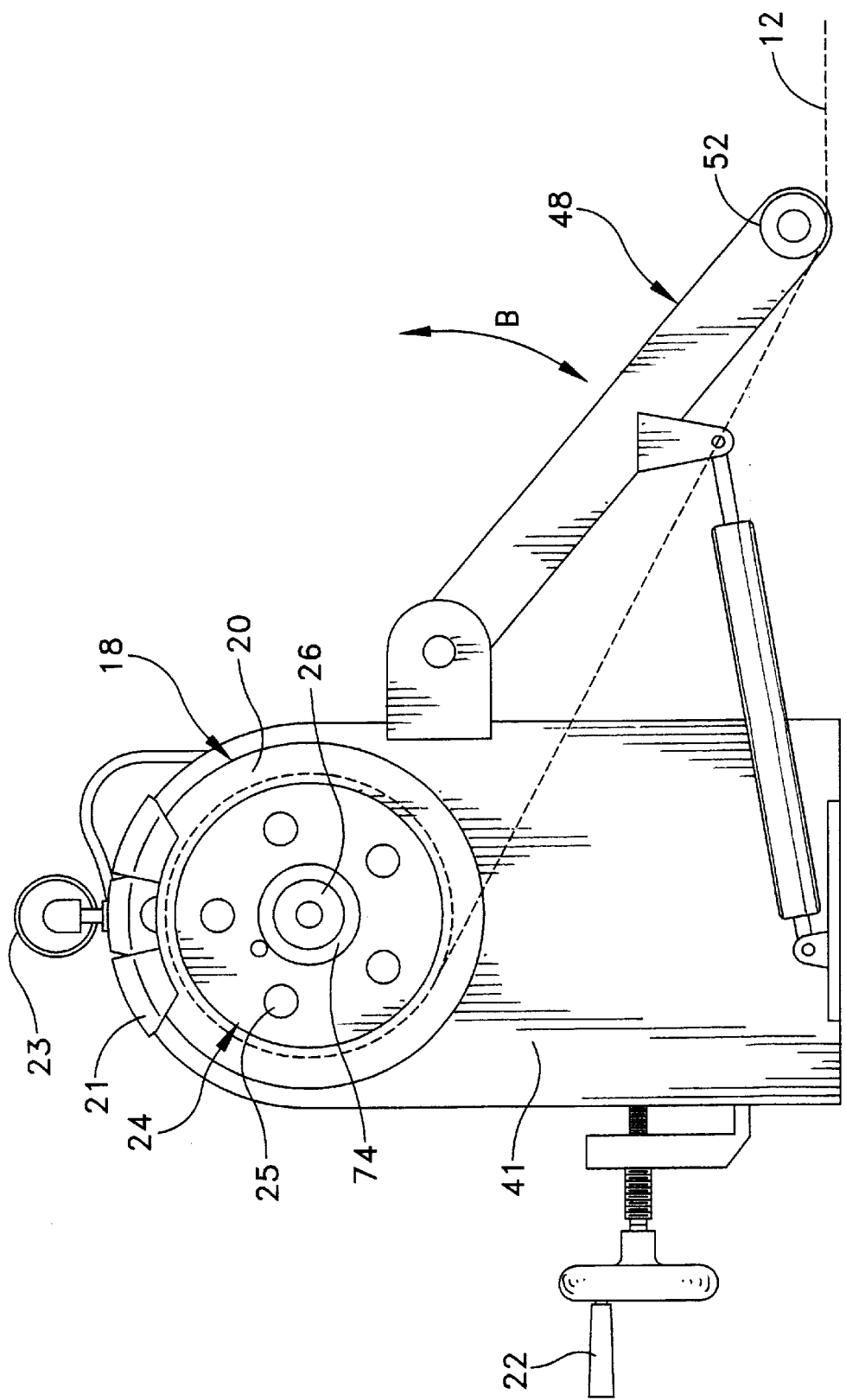
FIG. 4 is a front view of the brake tension unit of FIG. 1 showing the adjustable tension arm in a second position.

Referring now to FIGS. 2–4, extending from the rotor 20 is a core chucking system 24 including a mandrel or mounting arm 26 for securing a core 28 which includes the protective material 12 wound thereon. The core chucking unit can also be a pneumatic, hydraulic or electrical device, depending upon the user's preference. The core chucking system 24 is preferably secured to the rotor 20, for example by bolts 25, or may be constructed as a unitary member with the rotor. In either instance, as the rotor rotates around an axis "x", so does the chucking system. Thus, when pressure is applied to the rotor, rotation of the rotor and the attached core is slowed which restricts the unwinding of the protective material from the core. In this manner, as the material attempts to unwind from the core 28 a preselected force is applied to resist the unwinding. The material is therefore placed under tension and, due to the nature of the protective material, the material stretches or elongates under the applied pressure. As the material elongates or stretches in a longitudinal direction (represented by the arrow "L"), the material necks down, i.e. the width "w" of the material decreases. The amount of tension applied to the material, and the corresponding amount of the neckdown is directly related to the pressure at which the brake tension unit is set. In the present embodiment, polyethylene butylene rubber in tape form is the preferred material, although other materials which are capable of controlled elongation and which provide corrosion protection may also be utilized. Polyethylene butylene rubber has been found to elongate to a minimum of 0.25 inches less than its original width at a tension of about 30 lbs per inch width. Thus, for example, a 6 inch wide strip before neck down would need 180 lbs. of tension to neck down the strip to a 5.75 inch wide strip after elongation. It should be understood that any width material may be utilized with the present invention, and the amount of neckdown may also be adjusted, as desired. Preferably, the width of the material is from about 2–18 inches and the neckdown of the material is preferably from about 0.0625–0.5 of an inch.

The brake tension unit may be mounted to a frame 30 carried on a variable speed control station 32 (FIG. 2) which travels along the length of the pipe in order to uniformly apply the protective material. The frame which carries the brake tension unit may preferably include two upstanding posts 34, 36 mounted to a base 38 of the control station and a cross beam 40 supported by the two posts and extending therebetween. Outer post 34 is preferably mounted higher than inner post 36, such that cross beam 40 slopes downward from the outer post toward the inner post. The brake tension unit may be supported on a mounting plate 41 which is mounted onto the cross beam 40, for example by a sliding sleeve 43 as shown in FIG. 2. Alternately, the mounting plate may be attached to a swivel mount supported by the cross beam for readily adjusting the position or angle of the brake tension unit. In either case, the brake tension unit may be mounted at any position along the cross-beam, as desired, depending upon the diameter of the pipe. As shown in FIG. 1, the brake tension unit is moved upward, or away from the pipe for larger diameter pipes, and is moved downward, or toward the pipe for smaller diameter pipes. Thus, the position of the brake tension unit is both vertically and angularly adjustable depending upon the placement of the unit on the cross beam and the angle of the cross beam. Alternately, the posts 34, 36 may be vertically adjustable so as to adjust the position of the brake tension unit. Indicator marks may be provided on the cross beam in order to show the proper position for the posts for a given diameter pipe. In this manner, the brake tension unit may be readily used with pipes of various sizes.

The base 38 of the control station 32 is supported by and travels along an outer, bottom flange 42 of an I-beam 44 which makes up part of the base unit 17. At least one wheel, and preferably four, contact an inner, bottom flange 45 of the I-beam and are chain driven by a motor 46 supported on the control station. When the motor is powered, the wheels rotate to move the control station and brake tension unit back and forth along the length of the I-beam, as indicated by arrow "A". The speed of the motor is preferably adjustable in order to vary the speed at which the control station and brake tension unit travel along the length of the I-beam. The speed is pre-set depending upon the amount of time needed to apply the protective material onto the pipe, which is primarily a function of the diameter of the pipe.

The brake tension unit may also include a tension arm 48 for holding the protective layer against the pipe (FIG. 3) in order to prevent slack in the material as it is being spirally applied. The tension arm 48 preferably includes a support member 50 pivotally attached at one end to an upstanding portion of the mounting plate 41. The tension arm includes a roller 52 attached at an opposite end of the arm, the roller engaging the protective material as it is applied to the pipe to prevent slack in the material in order to uniformly apply the material onto the pipe. As shown in FIGS. 3 and 4, the tension arm is supported by a piston 54 which is attached at one end to mounting plate 41. The pivotal attachment and piston allows the tension arm to be supported in a variety of positions depending upon the diameter of the pipe, the arm being moveable as shown in FIG. 4 by arrow B.

Referring again to FIG. 1, machine 10 includes a base unit 17 having a frame 56 supported on one or more base members 58. The frame 56 includes a pair of I-beams 44, 55 which are preferably spaced from each other and are positioned generally parallel to one another. Supported on either end of the pair of I-beams are a pair of gears, or wheels 60, 62. Pipe 14 is preferably supported at a first end between the first pair of wheels 60 and is supported at a second end between the second pair of wheels 62. In the present embodiment, a core member 63 is inserted into the first end of the pipe and is connected to the frame 56 by a support or post member 64, in order to support the pipe between and in contact with the first and second pair of wheels 60, 62. The first pair of wheels 60 are each mounted to rotatable shafts 68, 70 which are each connected to a motor 72 for imparting rotation to the shafts. Rotation of the shafts 68, 70 rotate the first pair wheels 60 in either a clockwise or counterclockwise direction which, in turn, rotates the pipe 14. The operation of the machine and brake tension unit for applying a protective layer of material will now be described for an exemplary pipe, with reference to the figures.

Core member 63 is inserted into either end of a pipe 14, the pipe having a diameter of about 8 inches and a length of about 20 feet, the pipe having been cleaned and sprayed with a liquid adhesive 71. The liquid adhesive improves the sealing and adhesion of the protective material to the pipe. A first end of the pipe is mounted between the first pair of wheels 60 while the second end of the pipe is mounted between the second pair of wheels 62, as described above. The base 38 of the control station 32 is mounted to one of the I-beam members as previously described, and the brake tension unit 16 is mounted to the frame 30 carried by the control station. In the present embodiment, the brake tension unit 16 is supported on a mounting plate 41 which is attached by sliding sleeve 43 to the cross beam 40 of the frame. The sleeve 43 is positioned on the cross beam by an operator according to the diameter of the pipe to which the protective material is to be applied. The core 28 which includes the protective material 12 wound thereon is then placed onto the mounting arm 26 of the brake tension unit. The core is locked onto the mounting arm 26, for example by a locking bolt 74 and a first end of the material is pulled off the core by the operator and is placed onto a first position on the pipe. The anti-slack roller 52 is then positioned on an upper surface of the material (FIG. 3). The brake tension is then adjusted manually by rotating crank 22 until the desired tension is displayed on gauge 23. The motors connected to the base unit and the control station are then started to begin rotation of the wheels, and hence the pipe, and also to begin movement of the control station.

Figure 6:
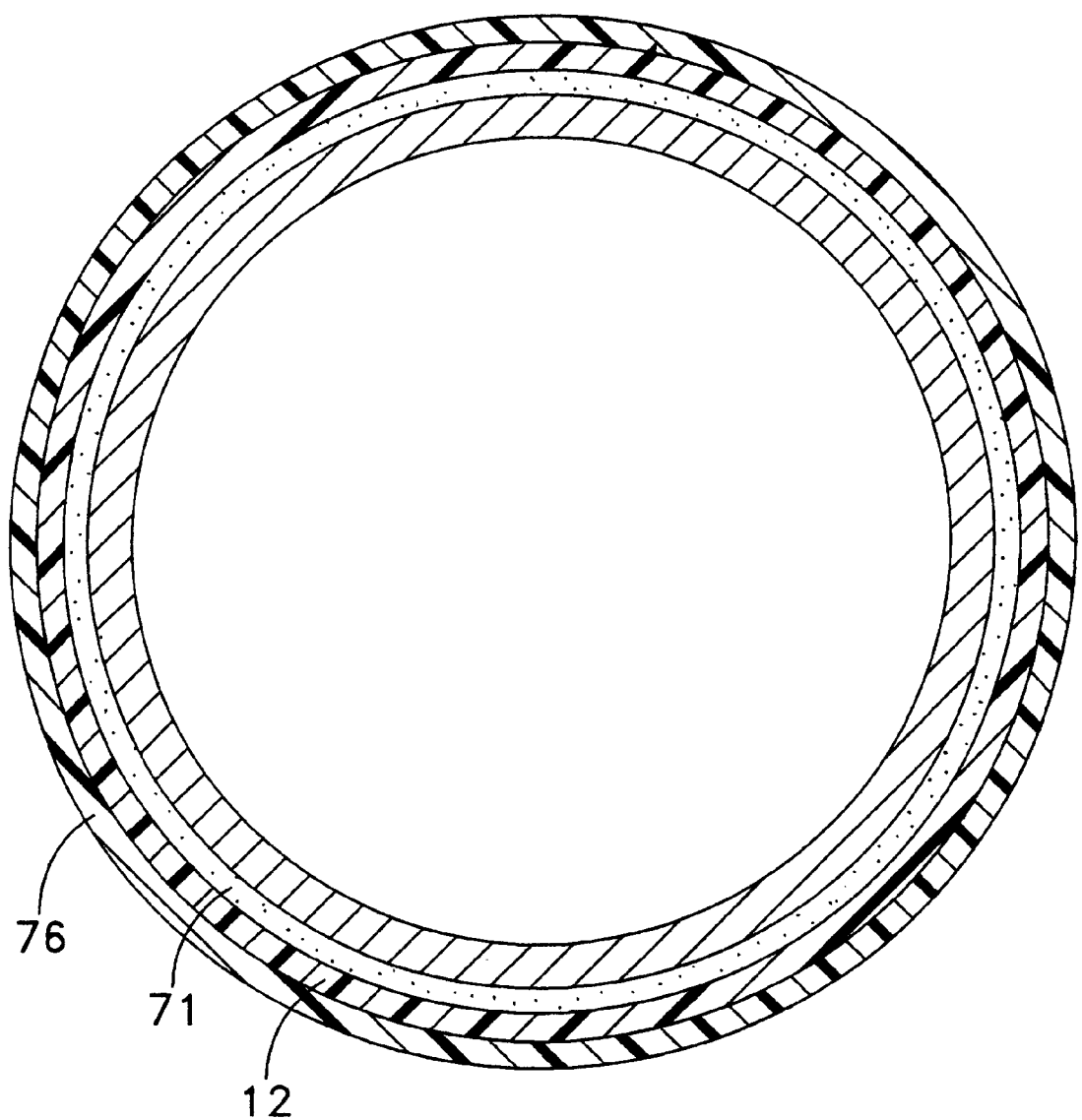
FIG. 6 is a cross-sectional view of the pipe having an adhesive layer and two layers of protective material applied thereon.

As the pipe rotates, material is pulled from the core 28, the unwinding of the material from the core being resisted by the brake tension unit. Thus, as the material attempts to unwind from the core a preselected force is applied by the brake tension unit which places the protective material under tension, causing the material to elongate as it is unwound. The elongated material travels under the anti-slack roller 52 and is applied to the outer surface of the pipe 14 in a spiral manner. Elongation of the material as the brake tension unit travels along the length of the pipe enables the material to be applied in a wrinkle free and continuous manner which improves adhesion of the material to the pipe. Because the material is applied under constant tension, air which would normally be entrapped between the outer surface of the pipe and the protective material is forced out, thereby providing improved corrosion resistance. The process may then be repeated to apply a second, outer layer 76 which provides a mechanical interface to protect against corrosion, the outer layer being placed over the first, inner layer. A cross-section of a pipe having two layers of corrosion resistant material applied thereon is illustrated in FIG. 6. It should be understood, however, that as many layers of protective material as desired may be applied utilizing the machine of the present invention.

It will be understood that various modifications may be made to the embodiment disclosed herein. For example, the disc brake may include either a single or dual rotor and calipers, or can be set with any number of rotor and calipers, as would be known to one of skill in the art. The brake may be operated by mechanical, electric, pneumatic or hydraulic means, the present embodiment being operated by hydraulic means. In addition, the present invention may be utilized with pipes of varying lengths, diameters and widths and is not limited to a specific size or type of pipe. Therefore, the above description should not be construed as limiting, but merely as exemplifications of a preferred embodiment.

Those skilled in the art will envision other modifications within the scope spirit of the invention.

What is claimed is:

1. A machine for applying a protective material onto a pipe in a substantially wrinkle free and continuous manner comprising:

a frame supported on one or more base members, the frame including a pair of beams spaced from each other and positioned generally parallel to one another;

at least one pair of wheels supported by the frame and positioned to receive a first end of the pipe therebetween, each of the at least one pair of wheels being mounted to a rotatable shaft;

a support member for positioning and supporting the pipe between and in contact with the at least one pair of wheels;

a first motor connected to each of the rotatable shafts for imparting rotation thereto so as to rotate the at least one pair of wheels, wherein rotation of the wheels causes rotation of the pipe disposed therebetween;

a brake tension unit including a disc brake having a rotor and a pair of pads for engaging the rotor so as to apply pressure to the rotor, a mounting arm extending from the rotor and constructed and arranged to hold a core of the protective material in engagement with the brake tension unit, and a pressure setting member for adjusting the pressure applied by the pads to the rotor; and wherein upon operation of the machine, rotation of the brake rotor and attached mounting arm is restricted by pressure applied by the brake pads such that as the protective material unwinds from the core it is placed under tension and necks down a preselected amount depending upon the amount of pressure applied by the brake pads, and is applied to the pipe in a substantially wrinkle free manner.

2. The machine according to claim 1, further comprising a control station mounted to one of the pair of beams and constructed and arranged to support the brake tension unit thereon, the control station being moveable along the length of the pipe so as to uniformly apply the protective material onto the pipe.

3. The machine according to claim 2, wherein the control station includes base, an outer post and an inner post upstanding from the base, and a cross beam supported by the outer and inner post and extending therebetween.

4. The machine according to claim 3, wherein the cross beam extends at an angle between the two posts such that a first end of the cross beam is higher than a second end of the cross beam.

5. The machine according to claim 4, wherein the brake tension unit is mounted to the cross beam by a sliding sleeve, wherein the sliding sleeve may be selectively positioned along the cross-beam to vary the height at which the brake tension unit is mounted.

6. The machine according to claim 3, wherein the base of the control station includes at least one wheel constructed and arranged to contact an inner flange of the beam, the wheels being driven by a motor for movement of the control station.

7. The machine according to claim 1, further comprising a tension arm including an anti-slack roller constructed and arranged to contact the material as it unwinds from the core so as to prevent slack in the protective material as it is applied to the pipe.

8. The machine according to claim 7, wherein the brake tension unit is supported on a mounting plate.

9. The machine according to claim 8, wherein the tension arm is pivotally attached at one end to an upstanding portion of the mounting plate and is further supported by a piston attached to the mounting plate.

10. The machine according to claim 1, further comprising a pressure gauge for indicating the pressure at which the brake tension unit is set.

11. The machine according to claim 1, further comprising a core member constructed and dimensioned to fit within the first end of the pipe so as to connect the pipe to the support member.

12. A machine for applying a protective material onto a pipe in a substantially wrinkle free and continuous manner comprising:

- a frame supported on one or more base members, the frame including a pair of beams spaced from each other and positioned generally parallel to one another in order to support the pipe;
- a rotation mechanism which imparts rotation to the pipe;
- a brake tension unit including a disc brake having a rotor and a pair of pads for engaging the rotor so as to apply pressure to the rotor, a mounting arm extending from the rotor and constructed and arranged to hold a core of the protective material in engagement with the brake tension unit, and a pressure setting member for adjusting the pressure applied by the pads to the rotor;
- a control station mounted to the frame and constructed and arranged to support the brake tension unit thereon, the control station being moveable along the length of the pipe so as to uniformly apply the protective material onto the pipe; and
- wherein upon operation of the machine, rotation of the brake rotor and attached mounting arm is restricted by pressure applied by the brake pads such that as the protective material unwinds from the core it is placed under tension and necks down a preselected amount depending upon the amount of pressure applied by the brake pads, and is applied to the pipe in a substantially wrinkle free manner.

13. The machine according to claim 12, wherein the rotation mechanism comprises at least one pair of wheels supported by the frame and positioned to receive a first end of the pipe therebetween, each of the at least one pair of wheels being mounted to a rotatable shaft.

14. The machine according to claim 13, wherein the rotation mechanism further comprises a first motor connected to each of the rotatable shafts for imparting rotation thereto so as to rotate the at least one pair of wheels, wherein rotation of the wheels causes rotation of the pipe disposed therebetween.

15. The machine according to claim 12, further comprising a tension arm including an anti-slack roller constructed and arranged to contact the material as it unwinds from the core so as to prevent slack in the protective material as it is applied to the pipe.

16. The machine according to claim 12, further comprising a pressure gauge for indicating the pressure at which the brake tension unit is set.

* * * * *